United States Patent [19]

Morimoto

[11] 4,012,340

[45] * Mar. 15, 1977

[54] PROCESS FOR PREPARING CATALYSTS FOR HYDRODESULFURIZATION

[75] Inventor: Tatsuo Morimoto, Yokohama, Japan

[73] Assignee: Chiyoda Kako Kensetsu Kabushiki Kaisha, Yokohama, Japan

[ * ] Notice: The portion of the term of this patent subsequent to May 4, 1993, has been disclaimed.

[22] Filed: Apr. 10, 1975

[21] Appl. No.: 566,817

Related U.S. Application Data

[63] Continuation-in-part of Ser. No. 222,640, Feb. 1, 1972, Pat. No. 3,954,673.

[30] Foreign Application Priority Data

Feb. 1, 1971 Japan .............................. 46-3946

[52] U.S. Cl. ............................. 252/465; 208/216
[51] Int. Cl.$^2$ .................... B01J 21/04; B01J 23/28
[58] Field of Search .................... 252/465; 208/216

[56] References Cited

UNITED STATES PATENTS 3,075,915   1/1963   Arnold et al. ................. 252/465 X
3,383,301   5/1968   Beuther et al. ................ 252/465 X

*Primary Examiner*—W. J. Shine
*Attorney, Agent, or Firm*—Armstrong, Nikaido & Wegner

[57] ABSTRACT

A process for preparing catalysts for hydrodesulfurization which have fine pores sharply distributed in the range of 50 to 200A by the steps of adding a molybdate to a water soluble aluminum complex represented by the general formula $Al_n(OH)_mX_{3n-m}$, wherein $1 < n < 100$, $3n > m$; $n/(3n-m) \leq 16$ and X is a univalent anion, to obtain a uniform solution composition, treating the same hydrothermally, then adding, if required by the desired catalyst composition, a molybdenum or tungsten compound; adding one or more cobalt or nickel compounds; further adding and mixing one or more members selected from polyhydric alcohols, high-molecular organic substances and amine group substances and then treating the mixture in usual ways such as drying, calcinating, grinding, moisture adjusting, molding, roasting and the like.

7 Claims, No Drawings

PROCESS FOR PREPARING CATALYSTS FOR HYDRODESULFURIZATION

CROSS REFERENCE TO RELATED APPLICATIONS

The present application is a continuation-in-part of Ser. No. 222,640, filed 2/1/72, now U.S. Pat. No. 3,954,673.

BACKGROUND OF THE INVENTION

The present invention relates to a process for preparing catalysts effective for the hydrodesulfurization of hydrocarbon oils. More particularly, it relates to a process for preparing catalysts effective for the hydrodesulfurization of hydrocarbon oils and which have a suitable range of fine pores and consist of alumina and the oxides of one or more metals selected from the group consisting of molybdenum, tungsten, iron, cobalt, and nickel.

Although the catalysts prepared according to the process of the present invention are applicable to any hydrocarbon oil, whether light or heavy, they show superior effectiveness in the desulfurization of heavy oils.

Heretofore catalysts for hydrodesulfurization composed predominantly of alumina and oxides of cobalt, nickel, and molybdenum have been prepared either by preparing a granular or molded γ-alumina impregnated with an acidic or ammoniac aqueous solution containing a salt such as cobalt nitrate or nickel nitrate and a salt such as ammonium molybdate, or by mixing and kneading aluminum hydroxide gel with a solution of said salts or, otherwise, by coprecipitating a mixed solution consisting of a solution of a salt of aluminum and a solution of said salts by the help of alkali.

However, these processes have a drawback in that the desired dispersion of the metals becomes uneven. In the impregnation process it has been proposed in Japanese Patent Publication No. 1891/1962 to use a Werner-type complex compound of cobalt for achieving uniform penetration of the metals into particles. This process, however, involves many difficulties because of lack of simplicity in operation. In the gel-mixing process the metals are not dispersed evenly but are carried in the form of masses, and therefore are unable to exhibit sufficient activity.

In the coprecipitation process, similarly, differences in the optimum pH for precipitation of the various metal ions constituting said salts results in the production of uneven precipitates and thereby makes the dispersiveness of the metals poor. As a method of improving these drawbacks, it has been proposed in Japanese patent application No. 66,510/1968 (corresponding to U.S. patent application Ser. No. 858,174, filed 9/15/69, now abandoned) to prepare a dispersant consisting of alumina and a metal or a metal oxide by using an Al-metal-complex. Pore size distribution is also an important consideration in the choice of a catalyst for the hydrodesulfurization of residue oils. This consideration is related to the fact that a considerable proportion of metals and sulfuric components contained in hydrocarbon oils are present in asphaltene. During the progress of desulfurization, particles of asphaltene may be decomposed, thereby depositing nickel, vanadium and other metals contained therein—particularly vanadium—on the catalyst. This deposition shortens the catalyst life by blocking up fine pores on the surface thereof.

The above-mentioned methods, such as the impregnation process and the mixing of gel, can normally provide only catalysts having fine pores of about 50A in diameter. Although as described later, there are several methods of producing carriers having pores larger than 50A; they all have serious operational drawbacks. For example, particles of alumina may be combined together by the action of various factors when they are being produced.

It is reported by Morikawa et al. (Journal of the Chemical Society of Japan, Industrial Chemistry Section, 64, 898 (1961)) that Ni carried on $Al_2O_3$ which is used in the hydrogenation of toluene shows a strong destructive activity if it is in a form such as NiO that is close to a free state and liable to be reduced. On the other hand, it shows a high hydrogenation power and a very little destructive activity if it has been obtained by reducing slightly reducible nickel aluminate, being finely and evenly dispersed.

It is easily understood from the foregoing that the reactivity, selectivity and life of catalysts may vary remarkably with the processes and conditions by and under which they are produced.

In the process according to Japanese Patent Application No. 66,501/1968, it is possible to produce dispersants whose constituents are dispersed evenly to a higher extent than previously possible, but subject to the limitation that the peak diameter of pore size distribution is about 60A or lower. A peak diameter of about 50A offers no problem so far as the reaction with normal hydrocarbons is concerned. In the case of heavy oils, however, it has been found from the results of various tests that the diffusion of reactants is a rate-determination step in the demetalization reactant of metal-containing compounds and asphaltene contained in said oils. Thus, if the pore size of the catalyst is small, metal is liable to penetrate the surface layer of the catalyst, deposit and block up the pores.

On the other hand, with respect to the desulfurization reaction, it was found from similar tests that the condition of dispersion, kind and quantity of the metals which improve the activity of surface and more important since sufficient reaction activity can be attained if surface reaction is carried out in a rate-determining way and fine pores are larger than 50A. It was also found, however, that the devanadium reaction can be produced with more ease with an increase in the peak diameter of pore size distribution and shorten the life of the catalyst since the deposition of vanadium will proceed faster than desulfurization.

The desulfurization reaction is governed by the reaction activity of the catalyst which is, in turn, dependent upon the condition of dispersion and the manner of adhesion of the metals. On the other hand, the demetallization reaction which is considered to have a great influence on the life of the catalyst depends on the peak diameter of pore size distribution, that is, the larger the diameter becomes, the faster the reaction proceeds. From a viewpoint of the life of the catalyst, there exists an optimum range of pore diameter extending from about 50 to 200A, particularly 70 to 150A.

Carriers having fine pores larger than 50A have heretofore been prepared by adding various kinds of additives to aluminum hydroxide gel, aging aluminum gel while drying, treating aluminum gel by steam or hydrolyzing an Al-alkoxide, such as aluminum isopropoxide.

All these processes have preventive steps against the consolidation of alumina particles which may be brought about by some temperature, atmospheric conditions, steam pressure or hydrophobicity at which they are produced.

As a result of an investigation of the conventional processes using an aluminum complex, it was found that the alumina obtained by simply calcinating the Al-complex is unsuitable for the purpose because of its smaller fine pores ranging in diameter from about 35 to 45A. Thus the adoption of a well-reproducible hydrothermal treatment for enlarging the particles of the aluminum complex was considered. When the diameter of fine pores in the aluminum complex thus treated was examined, however, it was found that diameters ranged broadly from 35 to 1000A and, additionally, that the pore volume was small.

It is believed that this comes from the fact that the aluminum complex itself is composed of various molecules having different molecular weights and that the reaction of hydrothermal treatment is one of hydrolyzing reactions, which do not proceed evenly when different molecules are involved.

According to the invention, a method has been discovered for controlling such hydrolyzing reactions. It has now been discovered that molybdenum compounds are effective for uniformly obtaining micro-crystals having a narrow colloidal range. Since the aluminum complex and the molybdenum compounds are positively and negatively charged, respectively, there may be some union or strong interaction between them. By adding the latter, the growth of the coagulated crystals of alumina hydrate in the aluminum complex can be prevented, thereby producing crystals of uniform size.

It is an object of the present invention, therefore, to provide a catalyst having an effective pore size for the prevention of the deposition of nickel and vanadium on the catalyst in view of the fact that such precipitation and deposition, which are considered to be responsible for the deterioration of the catalyst used in the desulfurization of hydrocarbon oils, e.g., residue oils, are largely dependent upon the size of the fine pores in the catalyst. Another object of the invention is to provide a method of preparation of catalysts that consume only a small amount of $H_2$; that is, promote only desulfurization selectively without causing destructive hydrogenation.

SUMMARY OF THE INVENTION

According to the present invention, a process is provided for preparing a catalyst for hydrodesulfurization comprising the steps of adding a suitable quantity of a molybdate to a water soluble aluminum complex having the general formula $Al_n(OH)_mX_{3n-m}$, wherein $n > 1$ and $3n > m$ and preferably $1 < n > 100$ and $n/(3n-m) \leq 16$; and wherein X is an anion including $NO_3^-$, $Cl^-$, $Br^-$, $I^-$, $ClO_4^-$, $HCOO^-$, and $CH_3COO^-$, to produce a uniform solution composition; treating the same hydrothermally, adding to the obtained slurry such members as are selected from the group consisting of molybdates, tungstates, and salts of cobalt and nickel that are necessary for providing the composition of the final catalyst, then adding a polyhydric alcohol, a high-molecular organic substance or an amine group substance or mixtures of these and treating the mixture thus obtained by drying, calcinating, grinding, moisture adjusting, molding, and roasting.

DETAILED DESCRIPTION

In the process according to the invention, a water-soluble aluminum complex of the general formula $Al_{n-(OH)_m}X_{3n-m}$ is employed generally in the form of a solution containing 1 to 20% by weight (as $Al_2O_3$), preferably 2 to 10%, of the aluminum complex. In the above general formula $n > 1$, preferably $1 < n < 100$, $3n > m$ and $n/(3n-m) \leq 16$; and X is a univalent anion which forms a water-soluble aluminum complex, such as $NO_3^-$, $Cl^-$, $Br^-$, $I^-$, $ClO_4^-$, $HCOO^-$ and $CH_3COO^-$; $NO_3^-$ and $Cl^-$ being particularly preferred.

The water-soluble aluminum complexes useful in the process according to the present invention may be prepared according to methods known in the art. Thus, for example, water-soluble aluminum complexes of the above general formula may be prepared according to the methods described in U.S. Pat. No. 3,544,476. Japanese patent publication No. 23,488/1971 also describes methods suitable for preparing certain of the water-soluble aluminum complexes within the scope of the general formula.

The processes described below will illustrate the preparation of the water-soluble complexes. Parts and percentages are by weight unless otherwise specifically defined.

I. To a corrosion-resistant normal pressure reactor of 0.005 –0.2m³ capacity, equipped with a heating and insulating device and a reflux condenser is charged a solution prepared by dissolving 172 parts of aluminum nitrate nona-hydrate ($Al(NO_3)_3 \cdot 9H_2O$) in 331 parts of pure water. After heating this aqueous solution to a temperature at which the solution of metallic aluminum can substantially start therein, an aliquot of aluminum formed from 24.9 parts of metallic aluminum particles divided into 10 equal parts and having particle size distribution of 20–200 mesh, is thrown into the aqueous solution, which is stirred so that the metallic aluminum particles are evenly dispersed in the solution.

As the solution of the metallic aluminum proceeds, the temperature of the aqueous solution rises until the solution boils by the large quantity of heat of solution and hydration. At the same time there are evolved gases which contain NO as the main constituent along with a few percent each of $N_2$, $N_2O$ and $H_2$. The reaction proceeds violently, 10–20 minutes after the addition of the metallic aluminum. It is complete after 2.0–3.0 hours and another aliquot of the aluminum particles is thrown into the solution.

When the aliquots of the metallic aluminum are successively added to the reaction in the above described manner, the reaction becomes the most violent at about the fourth through sixth addition, but thereafter gradually subsides, so that in order to maintain the temperature of the solution at 95° C the external heating is resumed as required.

In the course of the reaction, for example, when the solution of all the metallic aluminum thrown in at the 3rd, 5th, or 7th additions is complete, if a portion of the aqueous solution is withdrawn from the reactor it is observed in each case that the solution is colorless and transparent and in not a highly viscous state. When the portion of the solution is dried at 120° C. and an X-ray diffraction pattern (using Cu $K\alpha$line) taken from each of dried products is compared, it is found that the diffraction lines assigned to the aluminum nitrate hydrate gradually disappear and broad diffraction lines begin to appear at $2\theta=$ approximately 8°, 21°, and 41°. The table given below shows the aluminum concentration, pH value, and $x$ value in the mean composition formula $Al_2(OH)_{6-x}(NO_3)_x$ that were measured at the various stages of the aluminum addition.

TABLE

| Aluminum Aliquot No. | 3 | 5 | 7 |
|---|---|---|---|
| $Al_2O_3$(wt%) | 9.1 | 11.1 | 13.1 |
| pH | 2.5 | 2.7 | 2.9 |
| x | 4.1 | 3.1 | 2.1 |

After the addition of metallic aluminum is complete, heating is further continued with stirring for 10–24 hours until substantially all of the undissolved metallic aluminum enters into solution. The solution recovered after cooling is viscous liquid containing finely divided colloidal particles, which is a water soluble aluminum complex represented by the mean composition formula $(Al_2(OH)_{5.4}(NO_3)_{0.6})p$ having the properties: specific gravity, 1.20–1.25; pH, about 4.0; $Al_2O_3$ concentration, 14–14.5 wt %; $NO_3$-N concentration, 1.2 wt %, wherein $p$ is mean degree of polymerization and $½ < p < 50$.

II. To a corrosion-resistant normal pressure reactor of 0.005–0.05 m³ capacity, equipped with a heating and insulating device and a reflux condenser is charged a solution containing 203 parts of aluminum chloride hexahydrate ($AlCl_3.6H_2O$) in 960 parts of pure water. After heating this aqueous solution to a temperature at which the solution reaction of metallic aluminum can substantially begin therein, one aliquot of metallic aluminum formed from 114 parts of metallic aluminum particles divided into 12 equal parts and having a particle size distribution of 20–200 mesh, is thrown into the aqueous solution, which is stirred so that the metallic aluminum particles are evenly dispersed.

As the solution of the metallic aluminum proceeds, the temperature of the aqueous solution rises until the solution boils by a large quantity of heat of solution and hydration even with the interrupting external heating. At the same time hydrogen gas is evolved. The reaction proceeds most violently during 10–20 minutes after the throwing in of the metallic aluminum, but is complete after 2.0–3.0 hours and another aliquot of the metallic aluminum is further added to the solution.

When metallic aluminum is successively added in the above described manner, the reaction proceeds mildly after 7 times repetition of the throw, so that, as required to maintain the temperature of the solution at 95° C., external heating is applied.

Even after the addition of the metallic aluminum is complete, heating is further continued with stirring for 5–10 hours until substantially all of the undissolved metallic aluminum enters into solution. The solution recovered after cooling is a water soluble aluminum complex represented by the mean composition formula $(Al_2(OH)_5Cl)p$ which is colorless, transparent, and somewhat viscous, having the properties: $Al_2O_3$ concentration, 20–21 wt %; pH, 3.6; specific gravity, 1.28, wherein $p$ is defined above.

A molybdate, preferably a water-soluble inorganic molybdate such as ammonium molybdate $(NH_4)_2MoO_4$, solium 1-molybdate $Na_2MoO_4$, sodium 2-molybdate $Na_2Mo_2O_7$, ammonium paramolybdate $(NH_4)_6Mo_7O_{24}$. $4H_2O$, sodium paramolybdate $Na_6$-$Mo_7O_{24}.22H_2O$ and sodium 8-molybdate $Na_2$-$Mo_8O_{25}.17H_2O$, is used in the form of an aqueous solution containing 2 to 20% by weight, preferably 2 to 5%, of molybdenum. By adding the latter in such a quantity that the molybdenum contained therein corresponds to 2 to 20%, preferably 3 to 14%, by weight of the $Al_2O_3$ contained in the solution of said complex and stirring the mixture at a temperature between room temperature and 90° C for 10 to 60 minutes, a stable translucent solution composition is obtained.

This solution is then poured into an autoclave made of stainless steel or lined with glass or titanium for hydrothermal treatment. The hydrothermal treatment is effected in the usual way; for example, at 120° to 330° C for 0.5 to 15 hours, preferably at 160° to 260° C for 1 to 5 hours. In consideration of the thermal conductivity of the autoclave, it is desirable to raise the temperature at a rate less than 10° C per minute.

To cause the reaction to proceed more uniformly, it is also advisable to circulate part of the slurry once produced as the seed.

To the slurry obtained in the hydrothermal treatment, there may be added, depending on the desired composition of the main catalyst component of the catalyst, a member selected from the group consisting of compounds of molybdenum and tungsten. One or more compounds of cobalt and/or nickel, which metals are to be contained in the catalyst as a promoter, are added to the slurry from the hydrothermal treatment. The compounds of molybdenum, tungsten, cobalt and nickel are added to the slurry as aqueous or ammoniac solutions and then mixed and dispersed uniformly. The amounts of these compounds employed will depend on the desired composition of the catalyst. The metals may be contained in the catalyst in the following percentages by weight based on the weight of the catalyst: Mo — 5 to 20%; Ni — 0.1 to 10%; Co — 0.1 to 10%; W — 5 to 25%. Preferred percentages are: Mo — 5 to 20%; Ni — 0.5 to 7 %; Co — 0.5 to 7%; W — 5 to 25%. It may be seen that the range of molybdenum effective as a catalyst includes the range of molybdenum which is effective in controlling the pore size of the catalyst.

The preferred molybdenum and tungsten compounds employed according to the process of the invention are the ammonium, sodium and potassium salts. Ammonium salts are particularly preferred. As examples of the molybdenum and tungsten compounds there may be mentioned ammonium molybdate $(NH_4)_2MoO_4$, sodium molybdate $Na_2MoO_4$, potassium molybdate $K_2MoO_4$, ammonium paramolybdate $(NH_4)_6.Mo_7O_{24}.4H_2O$, sodium paramolybdate $Na_6Mo_7O24.4H_2O$, and potassium paramolybdate $K_6Mo_7O_{24}.4H_2O$, sodium tungstate, ammonium paratungstate, sodium paratungstate and the like. These compounds are soluble in water, aqueous ammonia and aqueous alcohol.

The compounds of cobalt and nickel that may be employed include the salts such as the nitrates, chlorides, bromides, iodides, sulfates, acetates and oxalates that are also soluble in water, aqueous ammonia and aqueous alcohol. The nitrates, sulfate, chlorides, oxalates and acetates are preferred.

It is also possible to use nickel carbonates or nickel oxides and cobalt carbonates or cobalt oxides by suspending their fine powders.

What remarkably distinguishes the present process whereby the extruded catalyst is produced by using an evenly dispersed slurry obtained by adding, as described above, the catalyst metals and a third substance to be described later to the hydrothermally treated product from the conventional processes is that the present process does not include the steps of filtering and washing.

In the first place, the slurry thus obtained is dried to 80° to 120° C by means of a stationary drier, spray drier, or the like, and then the moisture thereof is adjusted as such; and the product is molded into a desired shape by a tablet machine, extrusion machine, or rolling granulator. The molded product is then dried at 60° to 90° C for 1 to 10 hours, and further roasted in the rotary kiln, tunnel kiln, or box-type roasting furnace at 300° to 700° C for 1 to 15 hours, preferably at 400° to 600° C for 2 to 10 hours.

As compared with the catalysts obtained from the hydrothermally treated product containing no molybdenum, the catalyst obtained from the above-described process possesses pores that are sharply distributed in a preferred range. That is to say, in the absence of molybdenum, pore size is distributed evenly in the range of 35 to 1000A; but when molybdenum corresponding to 4% by weight of alumina is added, the distribution range is restricted to 50 to 200A. When the quantity of molybdenum is increased to 10.5% by weight, the range is further narrowed to 50 to 100A. The more molybdenum that is added, the sharper the pore size distribution range becomes and the smaller the peak diameter becomes. By adding a suitable quantity of molybdenum, it is possible to select a desired range of pore size distribution and a desired peak diameter. Thus, in the desulfurization of heavy oils wherein the pore size distribution of the catalyst employed is critical, it is possible to obtain a catalyst whose pore size is sharply distributed in the range of such relatively large sizes as 70 to 150A by decreasing the quantity of molybdenum compounds to be added. In desulfurizing light oils, on the other hand, the catalyst with relatively small fine pores may serve the purpose as is generally known. According to the present invention, it is also possible to obtain such a catalyst whose fine pores are distributed in the range extending from 50 to 70A by increasing the quantity of molybdenum compounds to be added. The process, according to the invention, differs from the conventional gel-mixing process not only in that it can disperse the catalyst metals evenly but also in the following point. In the conventional gel-mixing process, which consists of adding salts of the metals to fresh or aged gel, the metals may be carried unevenly; and no uniformly dispersed catalyst may be obtained since the alumina particles constituting the gel change with the elapse of time and considerable amounts of the carrier alumina and added metals may combine together. In the present process a strong combination of the catalyst metals and the carrier can be prevented because very fine boehmite-like crystals are evenly produced by the hydrothermal treatment.

During the drying step in the above-mentioned preparation process, there occurs aggregation of particles due to the surface tension of the water screen produced by the action of dehydration so that the total capacity of fine pores is reduced. A third substance is usually added, therefore, which generally exercises no other effect than a physical intervening effect and, therefore, serves to minimize the reduction of surface tension.

Generally, for example, one or more members selected from polyhydric alcohols, such as diethylene glycol, glycerin, and polyethylene glycol, and high molecular organic compounds, such as carboxymethylcellulose and Avicell, i.e., microcrystalline cellulose, is added in an amount equivalent to 20 to 200% by weight of $Al_2O_3$ to increase the total pore volume.

The addition of an amine group substance, such as hexamethylene tetramine, azodicarbonamide, and dinitrosopentamethylene tetramine, also produces an effect which has not been known before. The amine group substance may be added in an amount equivalent to about 20 to 200% by weight of $Al_2O_3$. It may be added either in the form of an aqueous solution or in the form of a solid. In the latter case the solid is allowed to dissolve in the slurry. Timing of addition should preferably be selected so that it will be added to the hydrothermally treated slurry, usually subsequent to the addition of the catalyst metals and prior to the drying step.

The effect achieved by the addition of the above-mentioned amine group substance consists of gelation, generation of heat, foaming, and dehydration, such that the dehydrated catalysts can be obtained with ease by calcinating the mixture at a very low temperature.

Thus, for example, hexamethylene tetramine, a weak base, can gelate the hydrothermally treated slightly acidic slurry by neutralization and can also neutralize the salts of the added catalyst metals into hydrates and further co-gelate the same with alumina and slurry which will eventually become the carrier. As the drying of the slurry proceeds and the temperature reaches 50° to 200° C, foaming and rapid dehydration take place following abrupt generation of heat, which temporarily reaches 400° to 500° C; and then an amorphous powdery catalyst can be produced at once.

It is not evident why such a process takes place. But it is believed that this phenomenon is brought about by the catalyst metals and results from the reduction of their oxides caused by a large quantity of formaldehyde produced by the abrupt decomposition of hexamethylene tetramine.

When the third substance is added, i.e., the polyhydric alcohol, high molecular organic compound or amine group substance, the total pore volume is enlarged throughout the whole size range, which results in the production of macro pore size larger than 500A that generally reduce the strength of the molded product remarkably. Since such macro pore size is unsuitable for desulfurization, the product is dried, calcinated, and ground to obtain smaller pore size in the range of 50 to 200A.

Calcination may be effected at 200° to 400° C for 1 to 10 hours in the rotary kiln or box-type roasting furnace while raising the temperature at a rate of 5° C or less per minute. With the use of hexamethylene tetramine, the calcination is preferably effected at 180° to 230° C for 1 to 7 hours; and with the other compounds, at 200°–400° C for 1 to 7 hours.

Grinding after roasting may be carried out either by a dry or wet method. In case of the wet method, the product will be ground with some water to the level of 10 $\mu$ or lower in a ball mill or other means.

After adjusting the moisture content, the ground product is molded into a desired shape and size by means of an extrusion molder, tablet machine, or rolling granulator. By the above-mentioned steps, almost all of the macro pore size larger than 500A that are produced by the addition of the third substance are destroyed; and catalysts suitable for a desulfurization reaction and having a pore size distributed in the range of 50 to 200A are produced.

The catalyst metals may be added not only immediately following the hydrothermal treatment but may be added at various stages of the process as described below.
1. The catalyst metals may be added after the preparation of a uniformly mixed solution containing the aluminum complex and molybdenum compound and prior to the hydrothermal treatment;
2. The catalyst metals may be added after calcination in the form of a solution and prior to grinding; or
3. The catalyst metals may be impregnated in $Al_2O_3$—$MoO_3$ which is obtained by roasting the molded product without adding the catalyst metals and serves as a usual carrier.

As described above the process according to the present invention is capable of providing a high dispersibility of the catalyst metals and, at the same time, producing catalysts whose pore size is distributed in a range that is effective in preventing the devanadium reaction which serves to deteriorate the catalyst particularly when it is used in desulfurizing heavy oils.

Furthermore, the process of preparation itself is improved over the conventional processes. In addition to a precipitating process, the conventional processes also require the steps of filtering and washing, which makes the entire process complicated, necessitates a great deal of time, reduces the yield of products, and makes the reproducibility of the properties and activities of the products unobtainable.

By improving the prior art processes by eliminating the steps of precipitating, filtering, and washing, simplifying the roasting step into a single stage and rendering the entire preparation process continuous so as to facilitate quality control, the present invention provides a process which is not only quite different from the conventional processes but also has a high industrial value.

The present invention will be further illustrated by the following nonlimitative examples.

EXAMPLE 1

286 parts of an aqueous solution containing 17.5% by weight (as $Al_2O_3$) of an Al-complex having the analytical composition of $Al_{14}(OH)_{40}(NO_3)_2$ and an aqueous solution of 4.3 parts of $(NH_4)_6.Mo_7O_{24}.4H_2O$ dissolved in 710 parts of water were mixed together. The mixture was hydrothermally treated in an autoclave of stainless steel at 200° C for 10 hours. To the sol thus produced, an aqueous solution made by dissolving 18 parts of $Ni(NO_3)_2.6H_2O$ in 50 parts of water was added, and 150 parts of a 20 weight percent hexamethylene tetramine solution was added to the mixture and vigorously stirred. After drying, this sol was kept at 180° C until it became powdery through an explosive reaction and then ground into a finer powder by a ball mill. After adjusting the moisture content, this powder was molded into tubular products having a diameter of 1.6 mm by means of an extruder. The extruded products were air-dried for 20 hours and then roasted at 400° C for 12 hours. The catalyst thus obtained indicated a specific surface area of 179 m²/g and a total pore volume of 0.471 cc/g. Its pore size was distributed as follows.

| 0 – 50A | 3 | percent |
|---|---|---|
| 50 – 75 | 18 | |
| 75 – 150 | 62 | |
| 150 – 200 | 3 | |
| 200 – 300 | 4 | |
| 300 – | 9 | |

COMPARATIVE EXAMPLE 1

For the purpose of comparison, the following catalyst was produced by a process in which no molybdenum was added when the product was hydrothermally treated.

When 1000 parts of an aqueous solution having a pH of 4.4 and containing 5.0% by weight (as $Al_2O_3$) of an Al-complex having the analytical composition of $Al_{14}(OH)_{40}(NO_3)_2$ was hydrothermally treated at 200° C for 5 hours, the solution was changed into a white sol having a pH of 2.1. After adding 18 parts of $Ni(NO_3)_2.6H_2O$ and 10 parts of $Co(NO_3)_2.6H_2O$, 150 parts of a 30 weight percent hexamethylene tetramine solution was further added, and the mixture was vigorously stirred and mixed. The pH of the mixture was then found to be 4.4. This sol was dried and then calcinated at 180° C. The gel so obtained was wet-ground and molded by the extruder. The molded products were air-dried for 48 hours and roasted at 480° C for 5 hours. The catalyst thus obtained showed a specific surface area of 188 m²/g, a total pore volume of 0.452 cc/g, and pore size distribution as tabulated below.

| 0 – 50A | 12 | percent |
|---|---|---|
| 50 – 75 | 13 | |
| 75 – 150 | 24 | |
| 150 – 200 | 7 | |
| 200 – 300 | 11 | |
| 300 – | 33 | |

EXAMPLE 2

To 1000 parts of an aqueous solution containing 5% by weight (as $Al_2O_3$) of an Al-complex having the analytical composition of $Al_{14}(OH)_{40}(NO_3)_2$, 13 parts of $(NH_4)_6Mo_7O_{24}.4H_2O$ (which corresponds to as much Mo as is equivalent to 14% by weight of $Al_2O_3$) was added and vigorously stirred and mixed to obtain a translucent solution. This solution indicated a pH of 4.5. When hydrothermally treated at 230° C for 3 hours in the stainless steel autoclave, this solution turned into a white opaque sol. The pH of this sol was 1.1. This sol was mixed with an aqueous solution consisting of 50 parts of water into which 18 parts of $Ni(NO_3)_2.6H_2O$ and 10 parts of $Co(NO_3)_2.6H_2O$ were dissolved, and then 150 parts of a 30 weight percent hexamethylene tetramine solution were added to the mixture and vigorously stirred. This sol, which indicated a pH of 5.0, was dried at 80° C for 10 hours in a drier and then calcinated at 200° C. After confirming the vigorous evolution of gases, the sol was ground by the powdering machine until an average particle diameter of 10μ was attained. After adjusting the moisture content, this powder was molded by the extruder using a die of 1.6 mm diameter. The product was air-dried for 3 days and then roasted at 500° C for 3 hours. The resultant catalyst indicated a specific surface area of 274 m²/g and a total pore volume of 0.540 cc/g. Its pore size was distributed as shown below.

| 0 – 50 | 9 | percent |
|---|---|---|

-continued

| | |
|---|---|
| 50 – 75 | 22 |
| 75 – 150 | 58 |
| 150 – 200 | 3 |
| 200 – 300 | 4 |
| 300 – | 4 |

50 cc of the catalyst of this invention is fed to a stainless reaction tube having 14 φ of diameter and 400 mm of length and is sulfurized under the following conditions:

| | |
|---|---|
| Temp. | 350° C |
| Time | 3 Hours |
| Pressure | 99 kg/cm²G |
| Oil Feed | Gas oil f DTB (3 weight percent sulfur) (DTB means ditertiary butyl disulfide) |
| h₂/oil | 1000 Nl/l |
| LHSV (Liquid hourly space velocity) | 1.0 hr⁻¹ |

Next, Khafji topping residual oil containing 3.75 weight percent of sulfur, 80 ppm of vanadium and 20 ppm of Ni is supplied thereto and the whole is treated for 100 hours under the following reaction conditions:

| | |
|---|---|
| Temp. | 370° C |
| Pressure | 99 kg/m²G |
| H₂/oil | 1000 Nl/l |
| LHSV | 1 hr⁻¹ |

After that, the temperature is raised up to 420° C and the reaction continued for 800 hours. Then, the sulfur portion in the produced oil is measured according to Recosulfur determinator. The determinator indicated a value of less than 1.4 weight percent of sulfur, the catalyst remaining active over a long period of time.

EXAMPLE 3

286 parts of a solution containing 17.5% by weight (as $Al_2O_3$) of an Al-complex having the analytical composition of $Al_{14}(OH)_{40}(NO_3)_2$ and a solution of 4.8 parts of $(NH_4)_2MoO_4$ (which corresponds to Mo equivalent to 4.7% by weight of $Al_2O_3$) dissolved in 709 parts of distilled water were mixed, and the mixture hydrothermally treated in an autoclave of stainless steel at 230° C for 2 hours. The product was a white opaque sol. To this sol, a solution prepared by dissolving 9.6 parts of $(NH_4)_2.MoO_4$ in 100 parts of water was added, and then a solution prepared by dissolving 11 parts of $CoCl_2.6H_2O$ in 40 parts of water was further added, and the mixture was mixed with 150 parts of a 30 weight percent glycerin solution and vigorously stirred. After drying at 70° C for 6 hours, the mixture was dried at 120° C for 3 hours and then further calcinated at 300° C for 3 hours. This calcinated product, which contains carboneous matter, assumed a brown color. This was wet-ground by the powdering machine, dried to reduce the moisture content to a suitable level and then molded by the extruder. The molded products were allowed to stand for a long time at the room temperature, and then roasted at 550° C for 4 hours. This catalyst assumed a deep blue color and indicated a specific surface area of 170 m²/g and a total pore volume of 0.545 cc/g. Its pore size was distributed as shown below.

| | | |
|---|---|---|
| 0 – 50A | 2 | percent |
| 50 – 75 | 15 | |
| 75 – 150 | 58 | |
| 150 – 200 | 10 | |
| 200 – 300 | 5 | |
| 300 – | 10 | |

50 cc of the catalyst of this invention is fed to the reaction device (tube) which is same as that in the above Example 2, and sulfurized under the same sulfurization conditions, then, the Khafji topping residual oil is treated just like that in the Example 2. The desulfurization rate after 1000 hours was 64% and the catalyst functioned in a desirable manner.

EXAMPLE 4

To 500 parts of a solution containing 10% by weight of an Al-complex having the analytical composition of Al $Al_{14}(OH)_{40}(NO_3)_2$, a solution prepared by dissolving 6.1 parts of $(NH_4)_6Mo_7O_{24}.4H_2O$ in 494 parts of water was added and mixed well. This mixed solution indicated a pH of 4.4 at 22° C. When it was hydrothermally treated at 230° C for 3 hours in an autoclave of stainless steel, a sol having white opaque luster was obtained. The pH of this sol was 1.2. After adding thereto a solution prepared by dissolving 69 parts of $(NH_4)_6Mo_7O_{24}.4H_2O$ in 70 parts of water, 400 parts of a 25 weight percent hexamethylene tetramine solution was further added and stirred therewith. This sol was dried in the drier at 80° C for 10 hours, and then calcinated at 230° C for 2 hours. When the temperature reached 180° C while being raised, it showed an explosive exothermic reaction accompanied by an offensive smell given out by the amine group compound. The gel thus obtained assumed a blackish brown or brown color. This sol had no more than 5% water of crystallization and was found to be amorphous when studied by the X-ray. This gel was then ground with 180 parts of a solution obtained by dissolving 25 parts of $Ni(NO_3)_2.6H_2O$ in water. When it became a viscous slurry with the evaporation of water, it was dried in a suitable manner and then molded by the extruder. The extruded products were air-dried for 2 days and then calcinated at 485° C for 6 hours.

This catalyst assumed a light green color and indicated a specific surface area of 274 m²/g, a total pore volume of 0.535 cc/g, and a pore size distribution as shown below.

| | | |
|---|---|---|
| 0 – 50A | 10 | percent |
| 50 – 75 | 26 | |
| 75 – 150 | 52 | |
| 150 – 200 | 6 | |
| 200 – 300 | 1 | |
| 300 – | 5 | |

A reaction experiment was conducted by employing exactly the same device as the reaction device used in Example 2 and employing 50 cc of the catalyst of this invention. The desulfurization conditions were identical to those in Example 2. The reaction was continued in such a manner that the desulfurization rate was 65% by raising the temperature gradually 3°–5° C at a time. As far as the result is concerned, it took more than 1500 hours for raising the reaction temperature up to 420° C, and the catalyst exhibited good catalytic activity.

EXAMPLE 5

To 286 parts of an aqueous solution containing 17.5% by weight (as $Al_2O_3$) of an Al-complex having the analytical composition of $Al_{14}(OH)_{40}(NO_3)_2$, 714 parts of an aqueous solution prepared by dissolving 13 parts of $(NH_4)_6Mo_7O_{24}.4H_2O$ in water was added and vigorously stirred. This mixed solution was poured into an autoclave of stainless steel and hydrothermally treated at 230° C for 4 hours. The white opaque sol thus obtained was mixed with a solution prepared by dissolving 9 parts of $NiSO_4.6H_2O$ and 6 parts of $CoSO_4.6H_2O$ in 35 parts of water. Thereafter 100 parts of a 30 weight percent polyethylene glycol (having an average molecular weight of 1,000) solution was added to the mixture and vigorously stirred. This uniform sol was dried by the spray drier at an inlet temperature of 350° C and an outlet temperature of 80° C, and then calcinated at 300° C for 5 hours to obtain a brown gel. The brown gel thus obtined was wet-ground by the ball mill until particles sufficiently suitable for molding were obtained. Then after adjusting the moisture content to a suitable level, it was molded by the extruder. The extruded products were air-dried for 11 hours, and then roasted at 500° C for 3 hours. The catalyst thus produced assumed a dark blue color and indicated a specific surface area of 298 m²/g and a total pore volume of 0.456 cc/g. Its pore size was distributed as shown below.

| 0 – 50A | 20 percent |
|---|---|
| 50 – 75 | 39 |
| 75 – 150 | 27 |
| 150 – 200 | 5 percent |
| 200 – 300 | 2 |
| 300 – | 7 |

EXAMPLE 6

114 parts of an aqueous solution containing 17.5% by weight (as $Al_2O_3$) of an Al-complex having the analytical composition of $Al_{14}(OH)_{40}(NO_3)_2$ and another aqueous solution prepared by dissolving 5 parts of $(NH_4)_6.Mo_7O_{24}.4H_2O$ in 881 parts of water were mixed together. This mixed solution, which showed a pH of 4.4, was poured into an autoclave of stainless steel and hydrothermally treated at 230° C for 3.5 hours. An opaque colloidal solution was produced and indicated a pH of 1.3. To this solution an aqueous solution prepared by dissolving 7 parts of $Ni(NO_3)_2.6H_2O$ and 4 parts of $Co(NO_3)_2.6H_2O$ in 20 parts of water was added. Thereafter, 100 parts of a 30 weight percent hexamethylene tetramine solution was further added and stirred well. The resultant substance which assumed the form of solution was converted by hexamethylene tetramine into the form of sol. The sol thus obtained indicated a pH of 4.7. This sol was dried in the drier at 70° C for 15 hours, and then calcinated at 200° C for 7 hours. At this time some parts of the sol could momentarily attain a temperature beyond 400° C because of an exothermic reaction accompanied by the instantaneous dehydration and the evolution of a large quantity of gas. The blackish brown gel so produced was ground by the powdering machine into particles having an average diameter of 10μ. After adding a suitable amount of water and allowing to stand for a week, the product was molded by the extruder into tubular pellets having a diameter of 1.6 mm. After drying, they were roasted at 600° C for 2 hours. The catalyst thus prepared indicated a specific surface area of 185 m²/g and a total pore volume of 0.621 cc/g. Its pore size was distributed as shown below.

| 0 – 50A | 6 percent |
|---|---|
| 50 – 75 | 11 |
| 75 – 150 | 43 |
| 150 – 200 | 20 |
| 200 – 300 | 6 |
| 300 – | 14 |

EXAMPLE 7

286 parts of an aqueous solution containing 17.5% by weight (as $Al_2O_3$) of an Al-complex having an analytical composition of $Al_{14}(OH)_{40}(NO_3)_2$ and another aqueous solution prepared by dissolving 13 parts of $(NH_4)_6Mo_7O_{24}.4H_2O$ in 701 parts of water were mixed together, and the mixture poured into an autoclave of stainless steel and hydrothermally treated at 290° C for 3 hours. The mixture before treatment showed a pH of 3.4, while the product of treatment, which was a white opaque sol, indicated a pH of 0.5. To this sol, an aqueous solution prepared by dissolving 18 parts of $Ni(NO_3)_2.6H_2O$ and 10 parts of $Co(NO_3)_2.6H_2O$ in 50 parts of water was added, followed by 450 parts of a 10 weight percent hexamethylene tetramine solution. The mixture was stirred vigorously. This sol showed a pH of 3.4. After drying at 80° C for 5 hours, the sol was calcinated at 200° C. After confirming an abrupt exothermic reaction around 180° C, it was maintained at 200° C for an hour. The gel-powder-like product thus obtained was ground with a suitable amount of water to fine particles and was molded by extruder (after adjusting the moisture content). The molded products were dried in a hot air circulating drier at 50° C for 10 hours and then calcinated at 550° C for 4 hours. This catalyst indicated a specific surface area of 272 m²/g and a total pore volume of 0.660 cc/g. Its pore size was distributed as shown below.

| 0 – 50A | 8 percent |
|---|---|
| 50 – 75 | 10 |
| 75 – 150 | 51 |
| 150 – 200 | 10 |
| 200 – 300 | 4 |
| 300 – | 17 |

EXAMPLE 8

To 286 parts of an aqueous solution containing 17.5% by weight (as $Al_2O_3$) of an Al-complex having the analytical composition of $Al_{14}(OH)_{40}(NO_3)_2$, 13 parts of $(NH_4)_6.Mo_7O_{24}.4H_2O$ was added and vigorously stirred. By hydrothermally treating this solution at 160° C for 6 hours in a glass-linked autoclave, a white lustrous sol was obtained. To this sol, a total amount of an aqueous solution prepared by dissolving 18 parts of $Ni(NO_3)_2.6H_2O$ and 10 parts of $Co(NO_3)_2.6H_2O$ in 50 parts of water was added. Thereafter, 150 parts of a 30 weight percent hexamethylene tetramine solution was added and stirred well. After drying in a drier, this sol was further dried in the electric furnace kept at 180° C until an explosive evolution of exothermic gas took place. After grinding and adjusting the mositure content, the product was molded by an extruder. The extruded product was air-dried, and then roasted at 500° C for 3 hours. The resultant catalyst had a specific surface area of 310 m²/g, a total pore volume of 0.40 cc/g; and a pore size distribution as shown below.

| 0 – 50A | 25 | percent |
|---|---|---|
| 50 – 75 | 40 | |
| 75 – 150 | 12 | |
| 150 – 200 | 3 | |
| 200 – 300 | 2 | |
| 300 – | 18 | |

50 cc of the so-produced catalyst was fed to the reaction device of Example 2 and desulfurization of the Khafji topping residual oil was carried out under the same conditions as those of the Example 4. 1000 hours were required for the temperature to reach 400° C. It was determined that the catalyst is good.

EXAMPLE 9

266 parts of an aqueous solution containing 18.8% by weight (as $Al_2O_3$) of an Al-complex having the analytical composition of $Al_8(OH)_{20}Cl_4$ and another aqueous solution prepared by dissolving 13 parts of $(NH_4)_6Mo_7O_{24}.4H_2O$ in 721 parts of water were mixed well, and the mixture hydrothermally treated at 180° C for 4 hours in a glass autoclave. To the white opaque gel thus produced, an aqueous solution prepared by dissolving 14 parts of $NiCl_2.6H_2O$ and 14 parts of $CoCl_2.6H_2O$ in 50 parts of water was added, followed by 150 parts of a 30 weight percent polyethylene glycol (having a molecular weight of 1,000) solution and stirred well. After sufficiently drying the viscous sol-like product at 80° C in a drier, it was further calcinated at 300° C for 2 hours. The brown gel-like product thus obtained was ground with an equivalent amount of water in the powdering maching until sufficiently small particles were obtained. Then the product was dried for some time, and molded by means of an extruder. The molded product was allowed to stand for 48 hours, and then roasted at 550° C for 2 hours. The catalyst thus obtained had a specific surface area of 302 m²/g and a total pore volume of 0.572 cc/g. Its pore size was distributed as shown below.

| 0 – 50A | 7 | percent |
|---|---|---|
| 50 – 75 | 26 | |
| 75 – 150 | 46 | |
| 150 – 200 | 7 | |
| 200 – 300 | 6 | |
| 300 – | 8 | |

EXAMPLE 10

286 parts of an aqueous solution containing 17.5% by weight (as $Al_2O_3$) of an Al-complex having the analytical composition of $Al_{14}(OH)_{40}(NO_3)_2$ and an aqueous solution prepared by dissolving 4.8 parts of $(NH_4)_2MoO_4$(4.7% by weight of Mo on the basis of $Al_2O_3$) in 709 parts of distilled water were mixed together. The mixture was hydrothermally treated in an autoclave of stainless steel at 230° C for 2 hours. To the white opaque sol thus produced was added a solution prepared by dissolving 15.3 parts of $(NH_4)_2W_4O_{13}.8H_2O$ in 50 parts of water followed by a solution prepared by dissolving 18 parts of $Ni(NO_3)_2.6H_2O$ and 10 parts of $Co(NO_3)_2.6H_2O$ in 50 parts of water. To the resulting mixture was further added an aqueous solution of 35 parts of the sodium salt of carboxymethylcellulose (CMC) in 100 parts of water. The mixture was vigorously stirred. After the sol was dried at 120° C for 10 hours, it was calcinated at 400° C. The product was ground in a ball mill, and after adjusting the moisture content, the ground product was molded by means of an extruder into columns having a diameter of 0.8 mm which were air-dried for 20 hours and then roasted at 550° C for 3 hours. The catalyst thus obtained indicated a specific surface area of 170 m²/g, a total pore volume of 0.5 cc/g, and a pore size distribution as follows.

| 0 – 50A | 4 | percent |
|---|---|---|
| 50 – 75 | 11 | |
| 75 – 150 | 65 | |
| 150 – 200 | 4 | |
| 200 – 300 | 5 | |
| 300 – | 11 | |

EXAMPLE 11

266 parts of an aqueous solution containing 18.8% by weight (as $Al_2O_3$) of an Al-complex having the analytical composition of $Al_8(OH)_{20}Cl_4$ and an aqueous solution prepared by dissolving 13 parts of $(NH_4)_6Mo_7O_{24}.4H_2O$ in 721 parts of water were thoroughly mixed. The mixture was hydrothermally treated in an autoclave made of glass at 200° C for 3 hours. To the pure white opaque gel thus produced was added a solution prepared by dissolving 14 parts of $NiCl_2.6H_2O$ and 14 parts of $CoCl_2.6H_2O$ in 50 parts of water. To the resulting mixture was added further 100 parts of Avicell (Microcrystalline cellulose). The mixture was vigorously stirred. After the resulting viscous sol-like material had been thoroughly dried at 80° C in a drier the product was calcinated at 400° C for 2 hours. The brown gel-like material thus produced was ground into a fine powder and after adjusting the mositure content the powder was molded by means of an extruder. After drying at 80° C the molded product was roasted at 550° C for 2 hours. The catalyst thus obtained had specific surface area of 245 m²/g and a total pore volume of 0.53 cc/g. Its pore size distribution was as follows.

| 0 – 50A | 5 | percent |
|---|---|---|
| 50 – 75 | 20 | |
| 75 – 150 | 52 | |
| 150 – 200 | 8 | |
| 200 – 300 | 5 | |
| 300 – | 10 | |

In each of the above examples, a catalyst similarly prepared without adding a molybdate to the aluminum complex indicated a broad distribution on the larger side of the pore diameter range.

Although the effect of desulfurization of hydrocarbon oils using the catalysts obtained in certain of the examples is not described, it can be easily recognized that these catalysts will also have excellent activity and durability.

Although certain embodiments of the process according to the invention have been described with respect to the foregoing examples, it is to be understood that the invention is not to be limited to these embodiments but is intended to include all embodiments within the scope and spirit of the appended claims.

What is claimed is:

1. A process for preparing a hydrodesulfurization catalyst which has fine pores sharply distributed in the range of 50 to 200A and comprising the steps of:

i. adding a molybdate to a water soluble aluminum complex represented by the formula $$Al_n(OH)_m X_{3n-m}$$

wherein
$1 < n < 100$,
$3n > m$,
$n/(3n-m) \leq 16$, and
X is an anion selected from the group consisting of Cl, $NO_3$, I, Br and $ClO_4$,
whereby there is obtained a uniform solution composition;

ii. treating the uniform solution composition of (i) hydrothermally at a temperature of from about 120° to about 330° C;

iii. adding thereto a water soluble salt of nickel or cobalt;

iv. further adding thereto and mixing a member selected from the group consisting of diethylene glycol, glycerin, polyethylene glycol, carboxymethylcellulose, microcrystalline cellulose, hexamethylene tetramine, azodicarbonamide and dinitrosopentamethylene tetramine; and v. treating the resultant mixture by drying, calcinating and grinding whereby said catalyst is obtained.

2. The process of claim 1 wherein the pore diameter of the catalyst is distributed in the range of 70 to 150A.

3. The process of claim 1 wherein said molybdate is a member selected from a group consisting of ammonium molybdate, sodium 1-molybdate, sodium 2-molybdate, ammonium paramolybdate, sodium paramolybdate and sodium 8-molybdate.

4. The process of claim 1 wherein said water-soluble salt of molybdenum is selected from the group consisting of ammonium molybdate, sodium molybdate, potassium molybdate, ammonium paramolybdate, sodium paramolybdate, and potassium paramolybdate.

5. The process of claim 1 wherein said water-soluble salt of nickel is selected from the group consisting of nitrates, chlorides, sulfates, acetates and oxalates of nickel.

6. The process of claim 1 wherein said water-soluble salt of cobalt is a member selected from the group consisting of nitrates, chlorides, sulfates, acetates, and oxalates of cobalt.

7. The process of claim 1 wherein hexamethylene tetramine is added in step (iv).

* * * * *